United States Patent
Wu (10) Patent No.: US 6,918,679 B2
(45) Date of Patent: Jul. 19, 2005

(54) SELF-ILLUMINATING DISPLAY SHELF ASSEMBLY

(76) Inventor: San-Chih Wu, No. 47, Huai-An St., San-Min Dist., Kaohsiung City (TW)

(*) Notice: Subject to any disclaimer, the term of this patent is extended or adjusted under 35 U.S.C. 154(b) by 65 days.

(21) Appl. No.: 10/606,251

(22) Filed: Jun. 25, 2003

(65) Prior Publication Data

US 2004/0264161 A1 Dec. 30, 2004

(51) Int. Cl.$^7$ .............................................. A47B 23/06
(52) U.S. Cl. ........................... 362/127; 362/31; 362/33; 362/94; 362/97; 362/132
(58) Field of Search .......................... 362/127, 31, 33, 362/92, 94, 97, 125, 132, 133

(56) References Cited

U.S. PATENT DOCUMENTS

| | | | |
|---|---|---|---|
| 5,361,599 A | * 11/1994 | Dasher | 62/298 |
| 5,461,547 A | * 10/1995 | Ciupke et al. | 362/31 |
| 6,210,013 B1 | * 4/2001 | Bousfield | 362/92 |
| 6,789,923 B2 | * 9/2004 | Liao | 362/294 |

* cited by examiner

Primary Examiner—Sandra O'Shea
Assistant Examiner—Mark Tsidulko
(74) Attorney, Agent, or Firm—Ohlandt, Greeley, Ruggiero & Perle, L.L.P.

(57) ABSTRACT

A self-illuminating display shelf assembly includes at least one shelf member formed as a light guide panel, a shelf support to hold the shelf member in a horizontal position, and an irradiating unit for irradiating the light guide panel. The light guide panel includes a top face, a bottom face, and an edge face interconnecting the top and bottom faces. The irradiating unit includes an elongated shroud mounted on the light guide panel and covering the edge face, and a light emitting element mounted on the shroud and confronting the edge face. The light emitting element is operable so as to produce light that is incident on the edge face of the light guide panel.

13 Claims, 10 Drawing Sheets

SELF-ILLUMINATING DISPLAY SHELF ASSEMBLY

BACKGROUND OF THE INVENTION

1. Field of the Invention

The invention relates to a display shelf assembly, more particularly to a display shelf assembly which is self-illuminating.

2. Description of the Related Art

Figure 1:
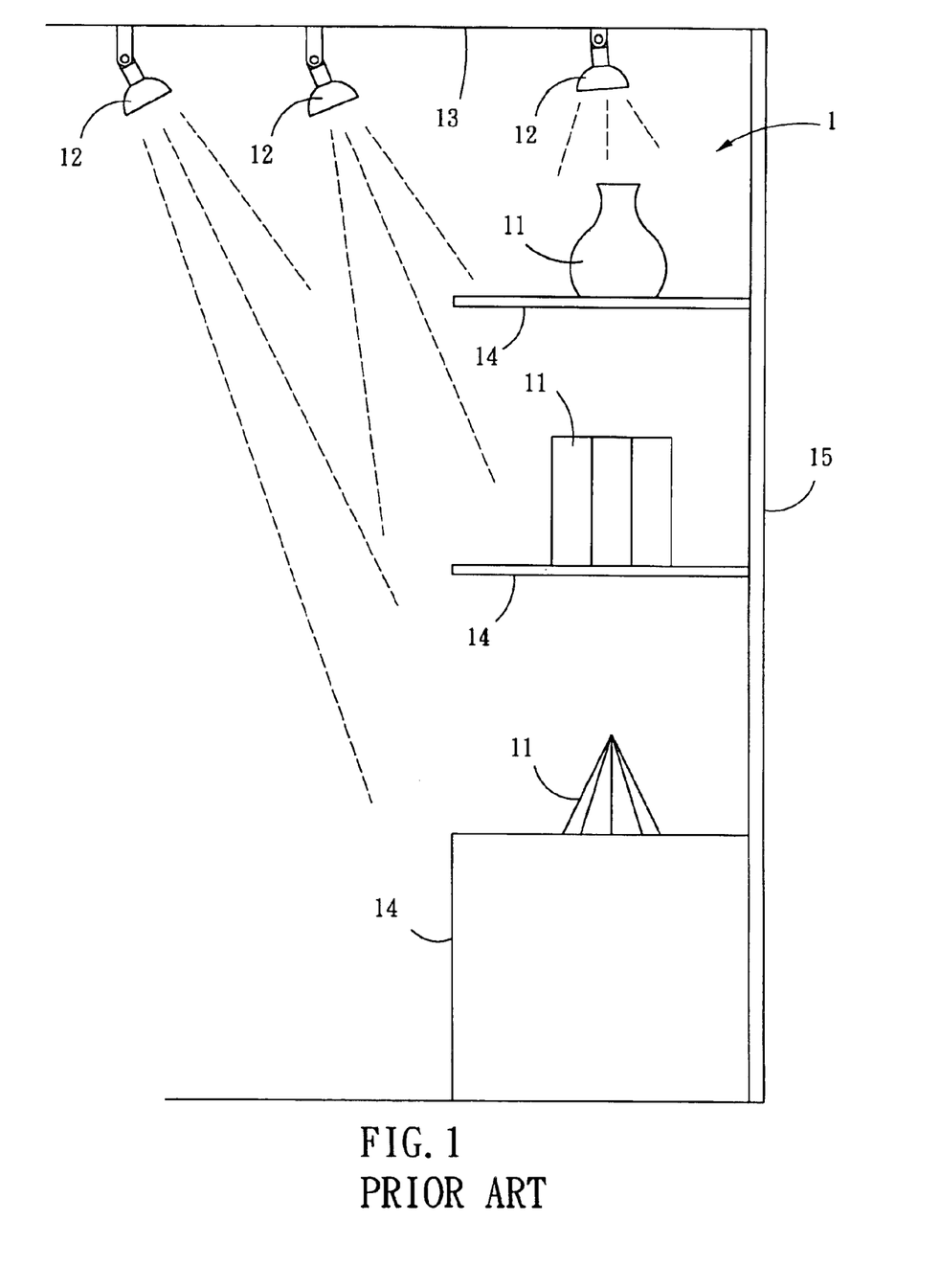
FIG. 1 is a schematic view of a conventional display shelf assembly.

Referring to FIG. 1, a conventional display shelf assembly 1 includes a plurality of display units 14 mounted on a wall 15, and a plurality of lighting fixtures 12 mounted on a ceiling 13 for projecting light on objects 11 disposed on the display units 14. Since the lighting fixtures 12 are fixed on the ceiling 13, the positions of the display units 14 are restricted. Additionally, it is required to adjust the lighting fixtures 12 when the positions of the objects 11 on the display units 14 are changed.

Figure 2:
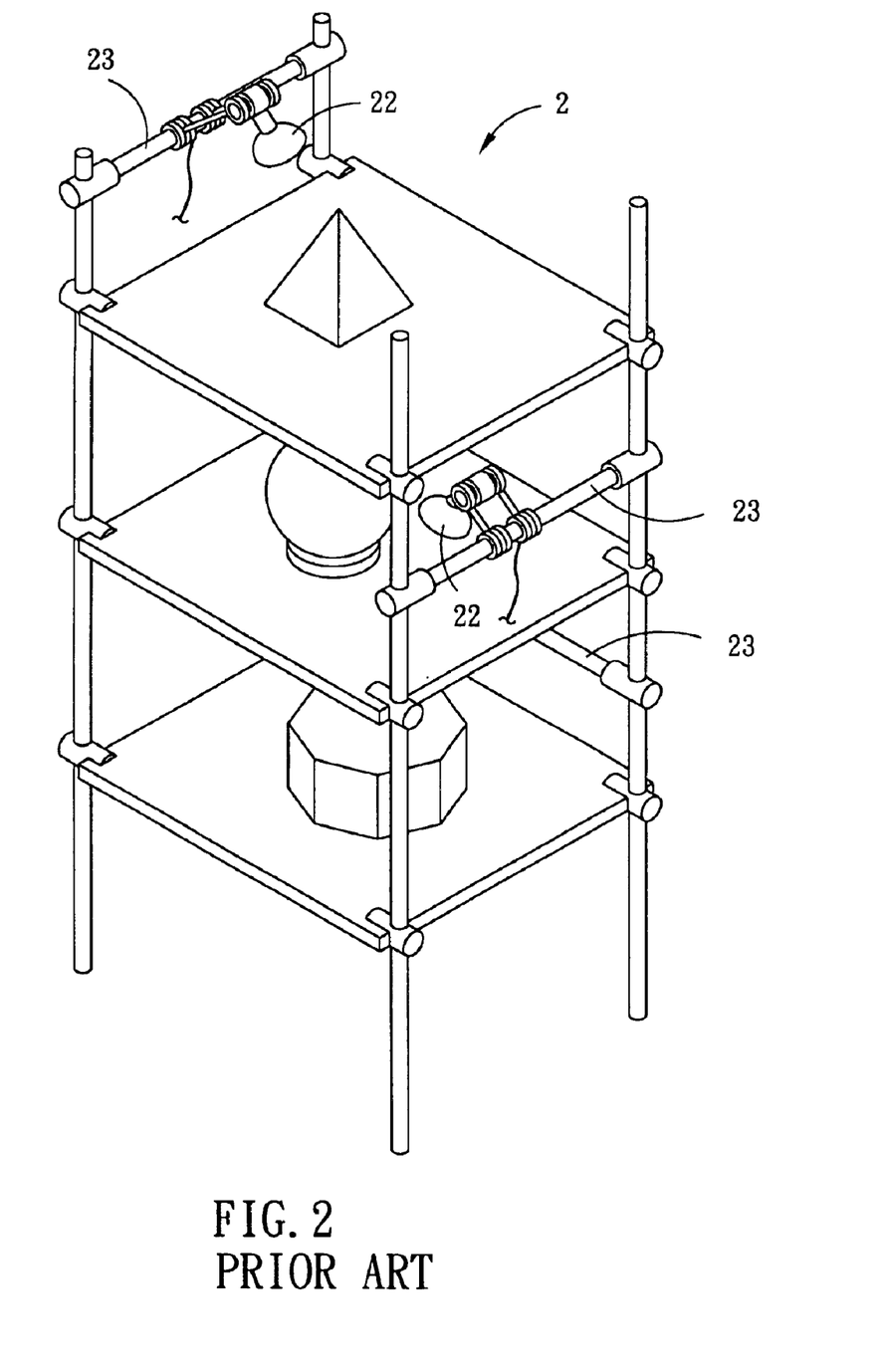
FIG. 2 is a perspective view of another conventional display shelf assembly.

Referring to FIG. 2, another conventional display shelf assembly 2 includes a plurality of transverse rods 23 and a plurality of lighting fixtures 22 mounted directly on the transverse rods 23. Although the conventional display shelf assembly 2 can overcome the shortcomings of the aforesaid prior art shown in FIG. 1, the lighting fixtures 22 occupy some of the display spaces of the shelf assembly 2, and have a negative effect on the overall aesthetic appeal of the shelf assembly 2.

SUMMARY OF THE INVENTION

Therefore, it is an object of the present invention to provide a display shelf assembly which is capable of self-illuminating so as to overcome the aforesaid shortcomings of the prior art.

According to this invention, the self-illuminating display shelf assembly includes at least one shelf member formed as a light guide panel, a shelf support to hold the shelf member in a horizontal position, and an irradiating unit for irradiating the light guide panel. The light guide panel includes a top face, a bottom face, and an edge face interconnecting the top and bottom faces. The irradiating unit includes an elongated shroud mounted on the light guide panel and covering the edge face, and a light emitting element mounted on the shroud and confronting the edge face of the light guide panel. The light emitting element is operable so as to produce light that is incident on the edge face of the light guide panel.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENT

Figure 3:
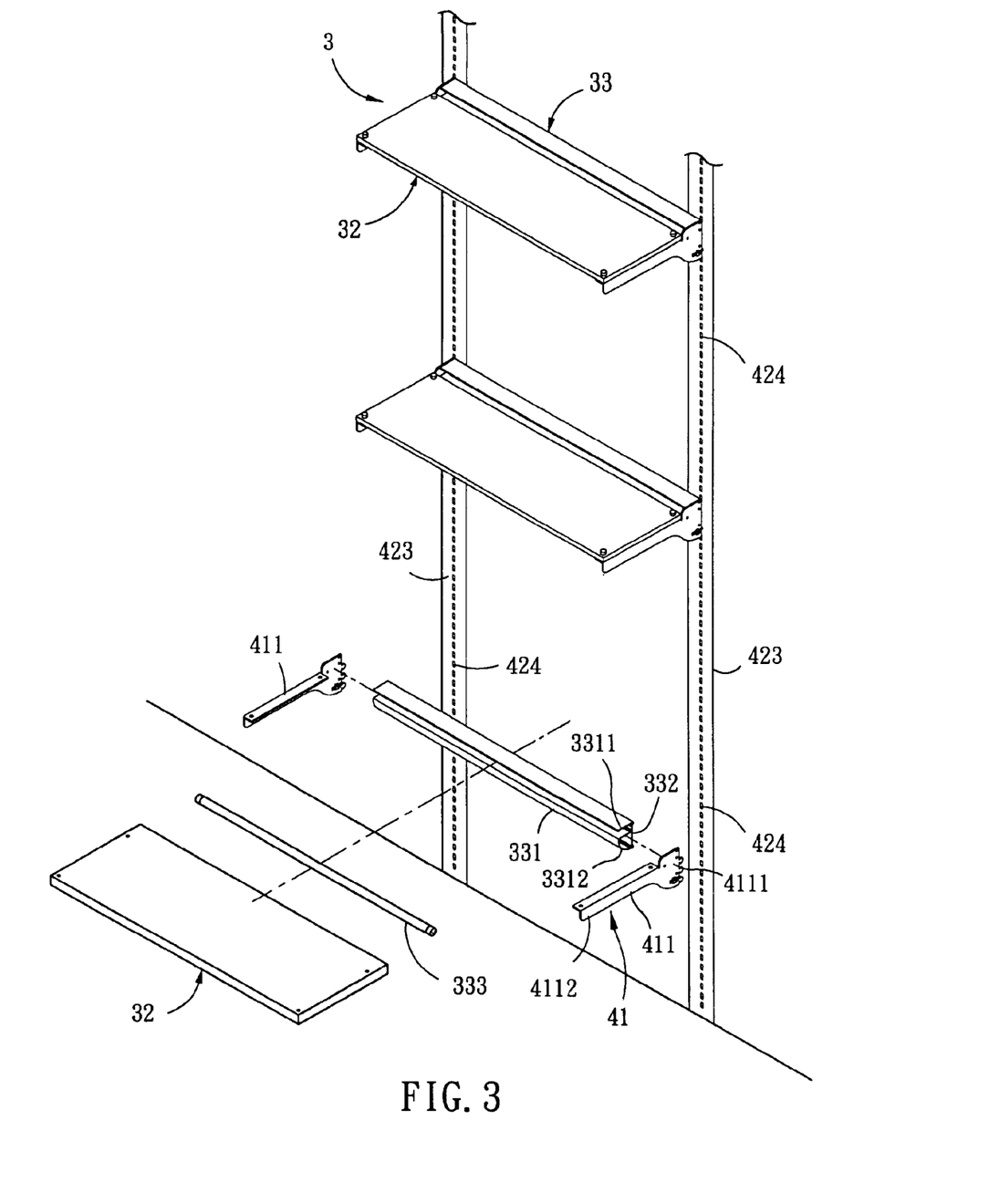
FIG. 3 is a partly exploded perspective view of the first preferred embodiment of the self-illuminating display shelf assembly according to this invention.
Figure 4:
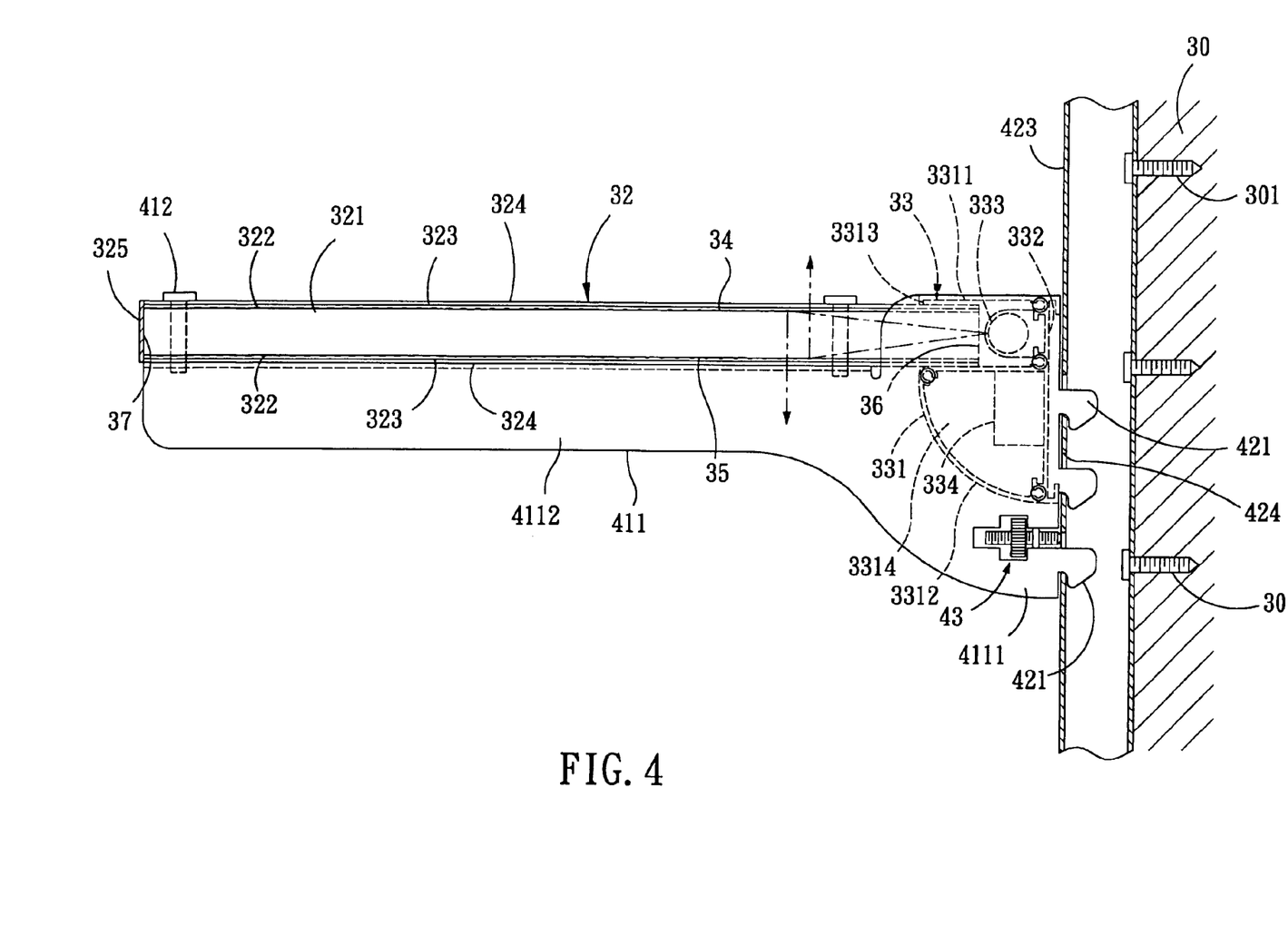
FIG. 4 is a fragmentary partly sectional view of the first preferred embodiment.
Figure 5:
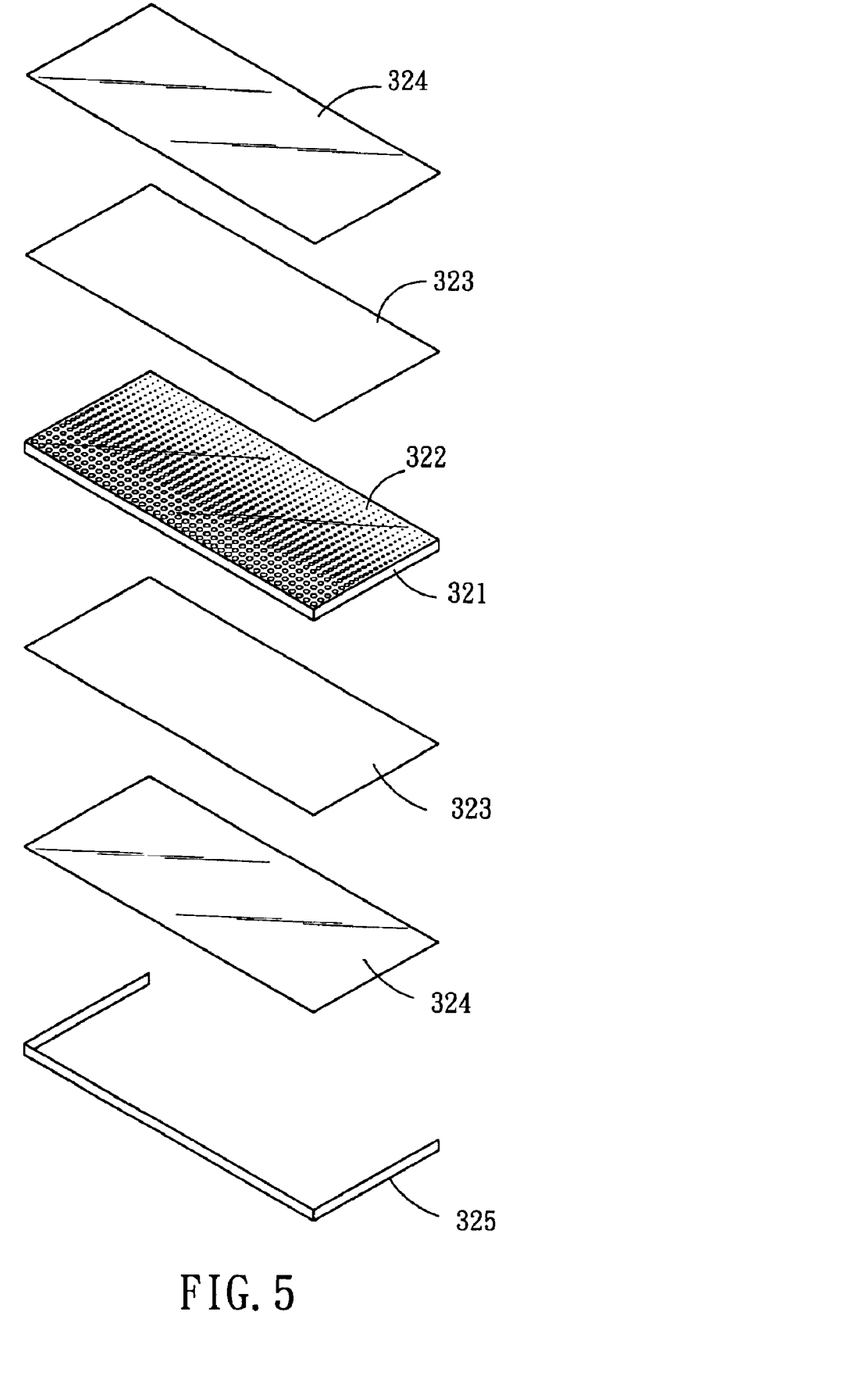
FIG. 5 is an exploded perspective view of a shelf member included in the first preferred embodiment.

Referring to FIGS. 3, 4 and 5, the first preferred embodiment of a self-illuminating display shelf assembly 3 according to this invention is shown to include a plurality of shelf members 32, each of which is formed as a transparent light guide panel 321, a shelf support 41 to hold the shelf members 32 in a horizontal position, and a plurality of irradiating units 33 for irradiating the light guide panels 321, respectively. Each of the light guide panels 321 includes a top face 34, a bottom face 35, and a first edge face 36 interconnecting the top and bottom faces 34, 35. Each of the irradiating units 33 includes an elongated shroud 331 mounted on the light guide panel 321 and covering the first edge face 36, and a light emitting element 333 mounted on the shroud 331 and confronting the first edge face 36. The light emitting element 333 is operable in a known manner so as to produce light that is incident on the first edge face 36.

The shroud 331 includes a longitudinal upper plate portion 3311, a longitudinal lower plate portion 3312, a longitudinal lateral plate portion 332 interconnecting the upper and lower plate portions 3311, 3312, and a longitudinal groove 3313 defined between the upper and lower plate portions 3311, 3312 to receive the first edge face 36 of the light guide panel 321. The light emitting element 333 extends between the first edge face 36 and the lateral plate portion 332. The longitudinal lower plate portion 3312 of the shroud 331 has a receiving space 3314 formed therein. Each irradiating unit 33 further includes a power unit 334 received in the receiving space 3314.

The light guide panel 321 further includes a second edge face 37 opposite to the first edge 36. The shelf member 32 further includes a reflection layer 325 overlying the second edge face 37. In this embodiment, the shelf member 32 further includes a plurality of light deflection parts 322 formed on the top and bottom faces 34, 35 of the light guide panel 321. Preferably, the light deflection parts 322 increase in size from the first edge face 36 in a direction toward the second edge face 37. The shelf member 32 further includes two translucent diffusing sheets 323, each of which overlies a corresponding set of the light deflection parts 322 of the light guide panel 321, and two transparent top plates 324, each of which overlies a corresponding one of the translucent diffusing sheets 323.

The shelf support 41 of this embodiment includes a pair of upright support members 423 secured on a wall 30 with the use of screws 301, and a plurality of pairs of horizontal support elements 411 having rear end plate portions 4111 mounted respectively on the upright support members 423. The upper, lower and lateral plate portions 3311, 3312, 332 of the shroud 331 of each irradiating unit 33 extend between and are connected to the rear end plate portions 4111 of the respective pair of the horizontal support elements 411. The horizontal support elements 411 further have front arm portions 4112 extending forwardly and respectively from the rear end plate portions 4111 to support the bottom face 35 of the respective light guide panel 321. Each of the shelf members 32 is secured on the front arm portions 4112 of the respective pair of the horizontal support elements 41 using any suitable manner well known in the art, such as with the use of screws 412. The upright support members 423 have a plurality of anchor holes 424. The rear end plate portions 4111 of the horizontal support elements 411 have anchor hooks 421 for engaging respectively the anchor holes 424 in the upright support members 423. The shelf support 41 further includes locking units 43 at the rear end plate portions 4111 for abutting against the upright support member 423 by screwing so as to reinforce the engagement between the horizontal support elements 411 and the upright support members 423.

Figure 6:
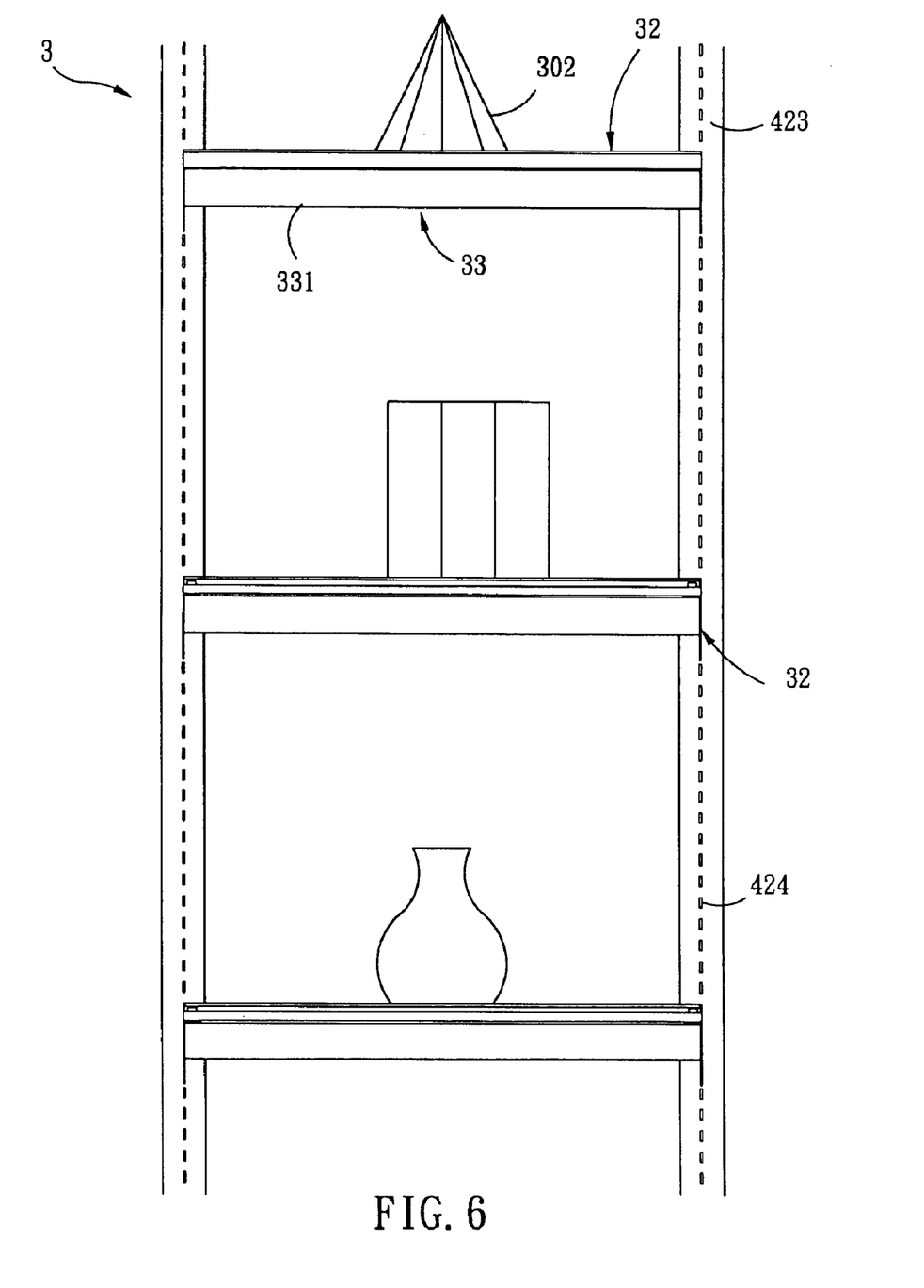
FIG. 6 is a fragmentary schematic front view of the first preferred embodiment.

Referring to FIGS. 3, 4, and 6, during installation of the self-illuminating display shelf assembly 3, the upright support members 423 are first secured on a wall 30 with the use of the screws 301. The anchor hooks 421 of each pair of the horizontal support elements 411 are then engaged respectively with the anchor holes 424 in the upright support members 423. Each of the shelf members 32, together with the corresponding irradiating unit 33, is subsequently secured on the respective pair of the horizontal support elements 41 with the use of the screws 412. Finally, the locking units 43 of the shelf supports 41 are screwed to abut against the upright support members 423 so as to reinforce the engagement between the horizontal support elements 411 and the upright support members 423.

After completing the installation, the irradiating units 33 are actuated by turning on the power units 334. The light incident through the first edge face 36 of the light guide panel 32 from the respective irradiating unit 33 is reflected toward the top and bottom faces 34, 35 of the light guide panel 32, thereby illuminating the objects 302 displayed on the shelf members 32.

Figure 7:
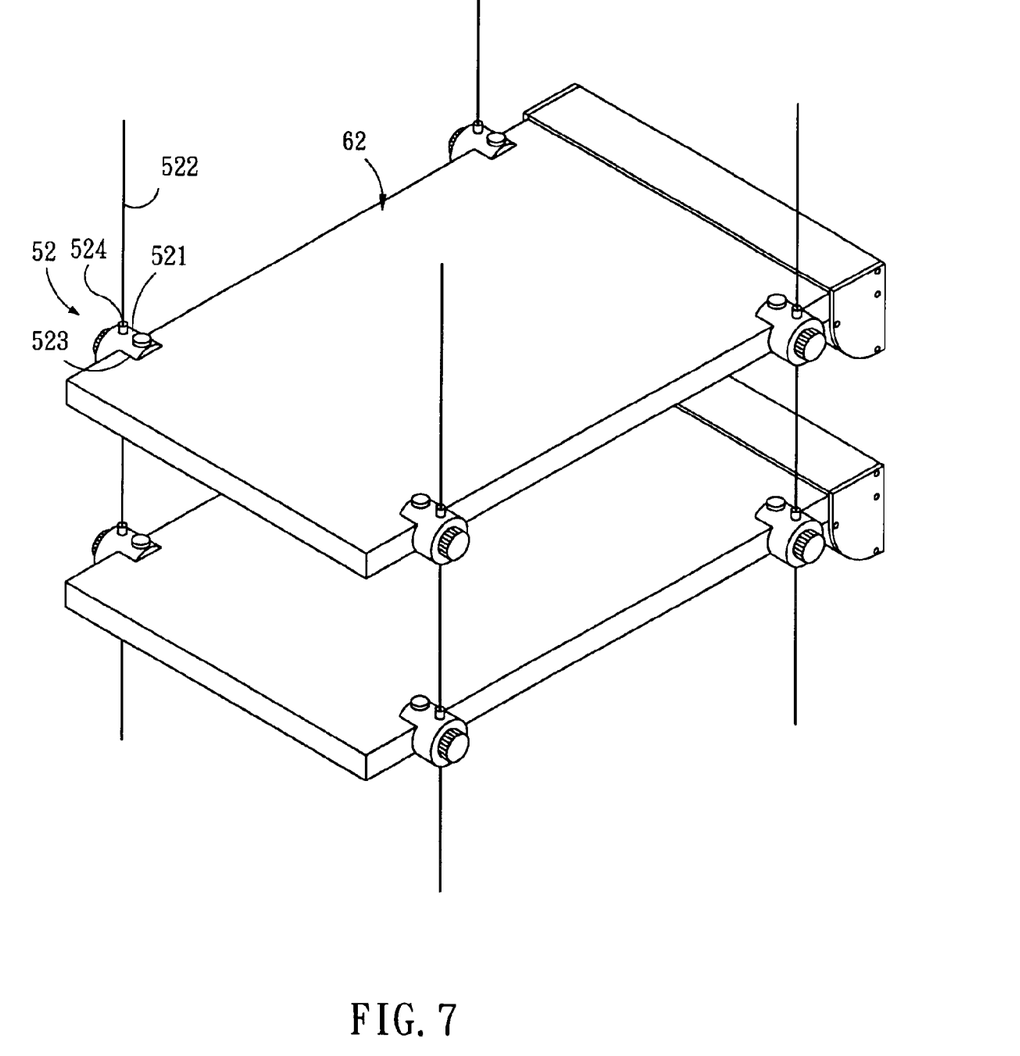
FIG. 7 is a fragmentary perspective view of the second preferred embodiment of the self-illuminating display shelf assembly according to this invention.
Figure 8:
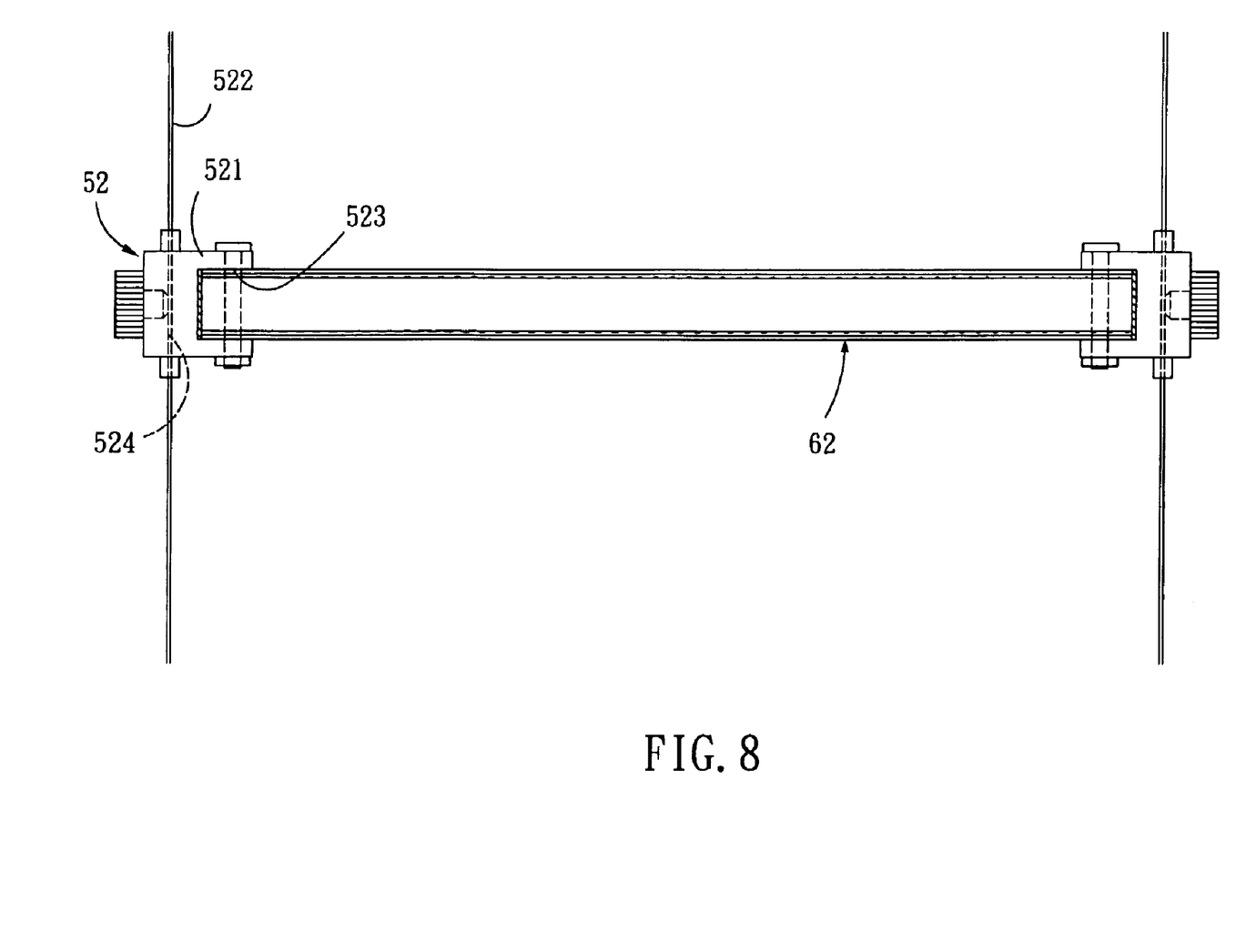
FIG. 8 is a fragmentary schematic partly sectional view of the second preferred embodiment.

Referring to FIGS. 7 and 8, the second preferred embodiment of this invention is similar to the first preferred embodiment in structure, except for the following. The shelf support 52 includes a plurality of hanging strings 522 to hang the light guide panel 62. Each of the hanging strings 522 includes at least one engaging element 521 connected to the light guide panel 62. The engaging element 521 has a vertical through hole 524 for extension of a corresponding one of the hanging strings 522, and a bifurcated end 523 to hold the light guide panel 62.

Figure 9:
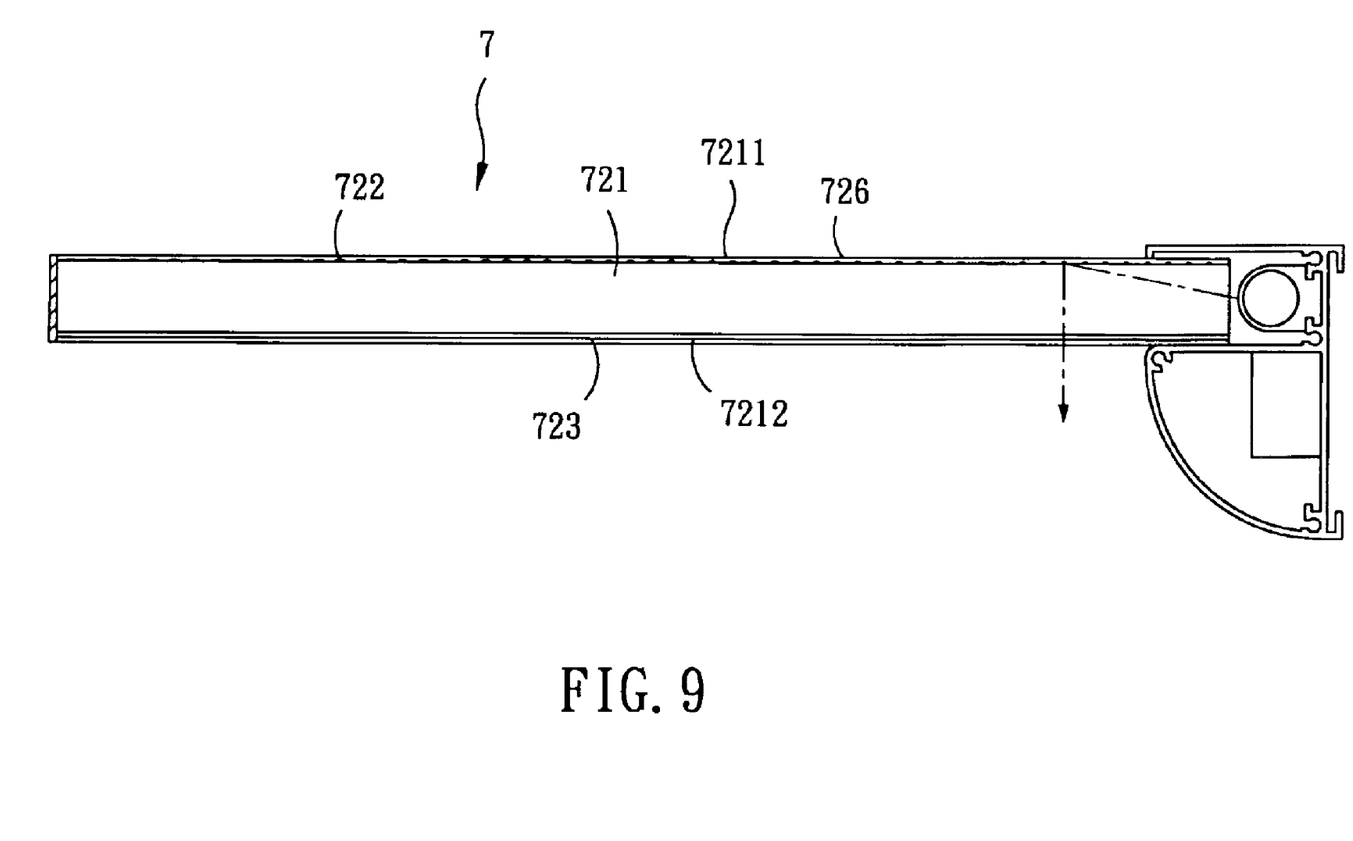
FIG. 9 is a fragmentary schematic partly sectional view of the third preferred embodiment of the self-illuminating display shelf assembly according to this invention.

Referring to FIG. 9, the third preferred embodiment of this invention is similar to the first preferred embodiment in structure, except for the following. The shelf member 7 includes a plurality of light deflection parts 722 formed on the top face 7211 of the light guide panel 721, a translucent diffusing sheet 723 mounted on the bottom face 7212 of the light guide panel 721, and a reflective sheet 726 covering the light deflection parts 722.

Figure 10:
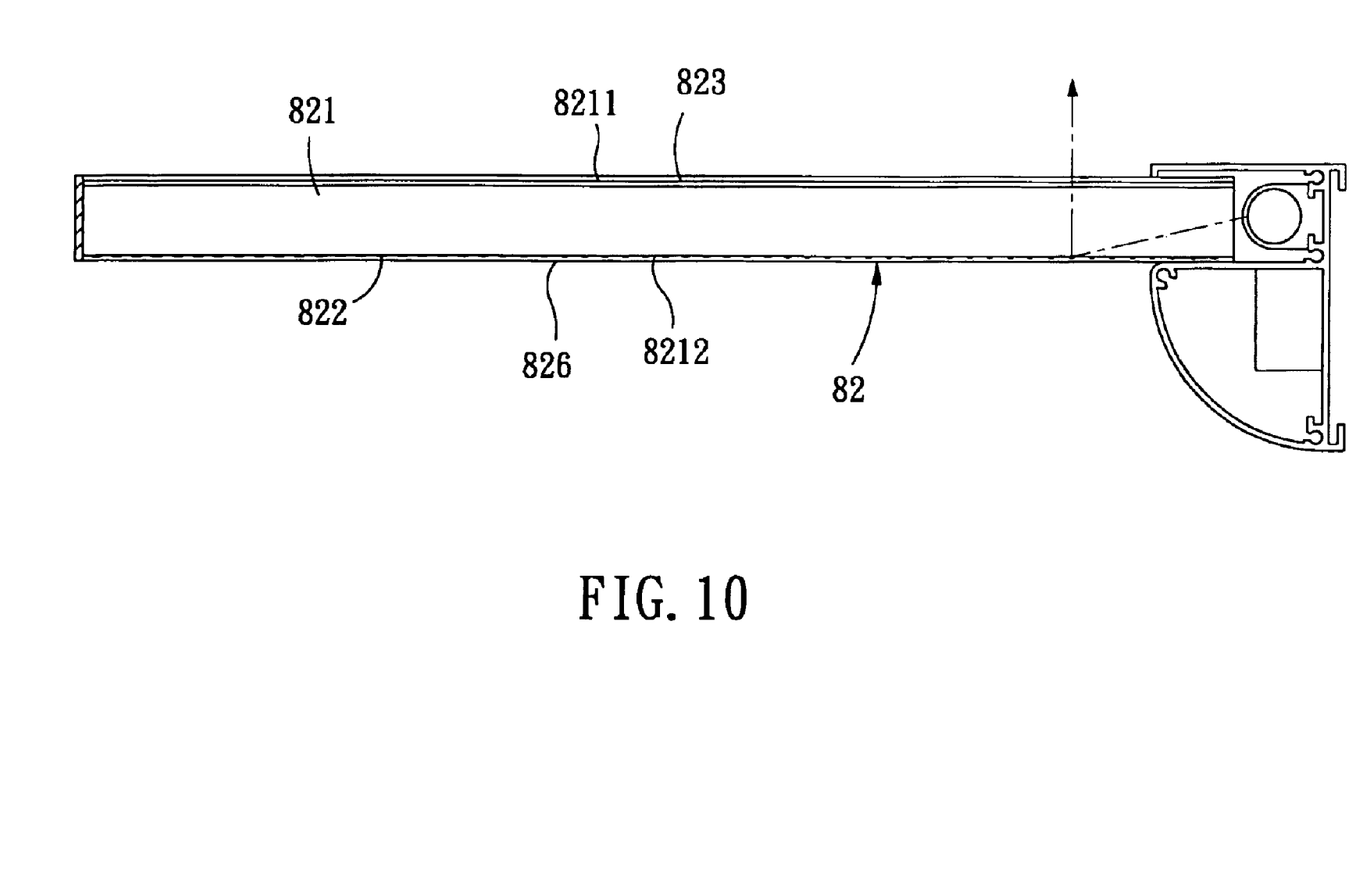
FIG. 10 is a fragmentary schematic partly sectional view of the fourth preferred embodiment of the self-illuminating display shelf assembly according to this invention.

Referring to FIG. 10, the fourth preferred embodiment of this invention is similar to the first preferred embodiment in structure, except for the following. The shelf member 82 includes a plurality of light deflection parts 822 formed on the bottom face 8212 of the light guide panel 821, a translucent diffusing sheet 823 mounted on the top face 8211 of the light guide panel 821, and a reflective sheet 826 covering the light deflection parts 822.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A self-illuminating display shelf assembly comprising:

at least one shelf member formed as a light guide panel;

a shelf support to hold said shelf member in a horizontal position; and an irradiating unit for irradiating said light guide panel;

wherein said light guide panel includes a top face, a bottom face, and a first edge face interconnecting said top and bottom faces;

wherein said irradiating unit includes an elongated shroud mounted on said light guide panel and covering said first edge face, and a light emitting element mounted on said shroud and confronting said first edge face, said light emitting element being operable so as to produce light that is incident on said first edge face;

wherein said shroud includes a longitudinal upper plate portion a longitudinal lower plate portion, a longitudinal lateral plate portion interconnecting said upper and lower plate portions, and a longitudinal groove defined between said upper and lower plate portions to receive said first edge face of said light guide panel, said light emitting element extending between said first edge face and said lateral plate portion; and wherein said longitudinal lower plate portion of said shroud has a receiving space formed therein, said irradiating unit further including a power unit received in said receiving space.

2. The self-illuminating display shelf assembly as claimed in claim 1, wherein said light guide panel further includes a second edge face opposite to said first edge face, said shelf member further including a reflection layer overlying said second edge face.

3. The self-illuminating display shelf assembly as claimed in claim 1, wherein said shelf member further includes a plurality of light deflection parts formed on at least one of said top and bottom faces of said light guide panel.

4. The self-illuminating display shelf assembly as claimed in claim 3, wherein said light guide panel further includes a second edge face opposite to said first edge face, said light deflection parts increasing in size from said first edge face in a direction toward said second edge face.

5. The self-illuminating display shelf assembly as claimed in claim 3, wherein said shelf member further includes a translucent diffusing sheet overlying said light deflection parts of said light guide panel, and a transparent top plate overlying said translucent diffusing sheet.

6. The self-illuminating display shelf assembly as claimed in claim 1, wherein said shelf support includes a pair of upright support members and a pair of horizontal support elements having rear end plate portions mounted respectively on said upright support members, said upper, lower and lateral plate portions of said shroud extending between and being connected to said rear end plate portions of said horizontal support elements, said horizontal support elements further having front arm portions extending forwardly and respectively from said rear end plate portions to support said bottom face of said light guide panel.

7. The self-illuminating display shelf assembly as claimed in claim 6, wherein said upright support members have a plurality of anchor holes, said rear end plate portions of said horizontal support elements having anchor hooks for engaging respectively said anchor holes in said upright support members.

8. The self-illuminating display shelf assembly as claimed in claim 1, wherein said shelf support includes a plurality of hanging strings to hang said light guide panel.

9. The self-illuminating display shelf assembly as claimed in claim 8, wherein each of said hanging strings includes at least one engaging element connected to said light guide panel.

10. The self-illuminating display shelf assembly as claimed in claim 9, wherein said engaging element has a vertical through hole for extension of a corresponding one of said hanging strings, and a bifurcated end to hold said light guide panel.

11. The self-illuminating display shelf assembly as claimed in claim 1, which includes a plurality of said shelf members which are mounted on said shelf support one above the other.

12. The self-illuminating display shelf assembly as claimed in claim 1, wherein said shelf member further includes a plurality of light deflection parts formed on one of said top and bottom faces of said light guide panel, a translucent diffusing sheet mounted on the other one of said top and bottom faces of said light guide panel, and a reflective sheet covering said light deflection parts.

13. The self-illuminating display shelf assembly as claimed in claim 12, wherein said light guide panel further includes a second edge face opposite to said first edge face, said light deflection parts increasing in size from said first edge face in a direction toward said second edge face.

* * * * *